(12) United States Patent
Poletto et al.

(10) Patent No.: US 7,929,534 B2
(45) Date of Patent: Apr. 19, 2011

(54) FLOW LOGGING FOR CONNECTION-BASED ANOMALY DETECTION

(75) Inventors: Massimiliano Antonio Poletto, Cambridge, MA (US); Andrew Ratin, Newton, MA (US); Edward W. Kohler, Jr., Los Angeles, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 1270 days.

(21) Appl. No.: 10/880,333

(22) Filed: Jun. 28, 2004

(65) Prior Publication Data

US 2005/0286423 A1 Dec. 29, 2005

(51) Int. Cl.
H04L 12/28 (2006.01)
(52) U.S. Cl. ............... 370/392; 370/395.31; 714/13
(58) Field of Classification Search .......... 370/229, 370/232; 714/776
See application file for complete search history.

(56) References Cited

U.S. PATENT DOCUMENTS

| | | |
|---|---|---|
| 5,793,753 A | 8/1998 | Hershey et al. |
| 5,796,942 A | 8/1998 | Esbensen |
| 5,796,956 A | 8/1998 | Jones |
| 5,886,643 A | 3/1999 | Diebboll et al. |
| 5,892,903 A | 4/1999 | Klaus |
| 5,940,870 A | 8/1999 | Chi et al. |
| 5,991,881 A | 11/1999 | Conklin et al. |
| 6,061,341 A | 5/2000 | Andersson et al. |
| 6,061,789 A | 5/2000 | Hauser et al. |
| 6,088,804 A | 7/2000 | Hill et al. |
| 6,108,782 A | 8/2000 | Fletcher et al. |
| 6,269,330 B1 | 7/2001 | Cidon et al. |
| 6,269,401 B1 | 7/2001 | Fletcher et al. |
| 6,279,113 B1 | 8/2001 | Vaidya |
| 6,282,546 B1 | 8/2001 | Gleichauf et al. |
| 6,301,668 B1 | 10/2001 | Gleichauf et al. |
| 6,304,262 B1 | 10/2001 | Maloney et al. |
| 6,321,338 B1 | 11/2001 | Porras et al. |
| 6,353,385 B1 | 3/2002 | Molini et al. |
| 6,363,489 B1 | 3/2002 | Comay et al. |
| 6,370,116 B1 | 4/2002 | Giroux et al. |
| 6,381,649 B1 | 4/2002 | Carlson |

(Continued)

FOREIGN PATENT DOCUMENTS

EP 1 079 583 2/2001

OTHER PUBLICATIONS

Steve Bellovin. DDoS Attacks and Pushback. NANOG21, Feb. 18, 2001 http://www.aciri.org/pushback.

(Continued)

*Primary Examiner* — Seema S Rao
*Assistant Examiner* — Wanda Z Russell
(74) *Attorney, Agent, or Firm* — Park, Vaughan, Fleming & Dowler, LLP

(57) ABSTRACT

A plurality of flow collector devices is disposed to collect flow information on a network. Duplicate flow records received from the flow collectors are eliminated by determining whether a pair of flow records has the same, source and destination flow identifiers and were received within a predefined time-period. Non-duplicated flow records received from the plurality of flow collector devices are stored and used to produces a connection table that maps each node on the network to a record that stores information about traffic to or from the node from non-duplicated flow records. The connection table stores statistical information of packets on the network based on a time-slice basis.

33 Claims, 10 Drawing Sheets

U.S. PATENT DOCUMENTS

| | | |
|---|---|---|
| 6,388,992 B2 | 5/2002 | Aubert et al. |
| 6,389,448 B1 | 5/2002 | Primak et al. |
| 6,442,694 B1 | 8/2002 | Bergman et al. |
| 6,487,666 B1 | 11/2002 | Shanklin et al. |
| 6,499,107 B1 | 12/2002 | Gleichauf et al. |
| 6,535,484 B1 | 3/2003 | Hughes et al. |
| 6,578,147 B1 | 6/2003 | Shanklin et al. |
| 6,591,306 B1 | 7/2003 | Redlich |
| 6,597,661 B1 | 7/2003 | Bonn |
| 6,597,957 B1 | 7/2003 | Beakley |
| 6,609,205 B1 | 8/2003 | Bernhard et al. |
| 6,678,827 B1 | 1/2004 | Rothermel et al. |
| 6,691,213 B1 | 2/2004 | Luu et al. |
| 6,725,378 B1 | 4/2004 | Schuba et al. |
| 6,735,702 B1 | 5/2004 | Yavatkar et al. |
| 6,738,814 B1 | 5/2004 | Cox et al. |
| 6,751,688 B1 | 6/2004 | El-Demerdash et al. |
| 6,775,657 B1 | 8/2004 | Baker |
| 6,789,203 B1 | 9/2004 | Belissent |
| 6,807,667 B1 | 10/2004 | Bar et al. |
| 6,816,910 B1 | 11/2004 | Ricciulli |
| 6,816,973 B1 | 11/2004 | Gleichauf et al. |
| 6,848,005 B1 | 1/2005 | Plevyak et al. |
| 6,918,067 B2 | 7/2005 | Bartucca et al. |
| 6,944,673 B2 | 9/2005 | Malan et al. |
| 2002/0023089 A1 | 2/2002 | Woo |
| 2002/0031134 A1 | 3/2002 | Poletto et al. |
| 2002/0032774 A1 | 3/2002 | Kohler, Jr. et al. |
| 2002/0032871 A1 | 3/2002 | Malan et al. |
| 2002/0032880 A1 | 3/2002 | Poletto et al. |
| 2002/0035628 A1 | 3/2002 | Gil et al. |
| 2002/0035683 A1 | 3/2002 | Kaashoek et al. |
| 2002/0035698 A1 | 3/2002 | Malan et al. |
| 2002/0038339 A1 | 3/2002 | Xu |
| 2002/0095492 A1 | 7/2002 | Kaashoek et al. |
| 2002/0103886 A1 | 8/2002 | Rawson, III |
| 2002/0103916 A1 | 8/2002 | Chen et al. |
| 2002/0116491 A1 | 8/2002 | Boyd et al. |
| 2003/0046577 A1 | 3/2003 | Silverman |
| 2003/0149919 A1 | 8/2003 | Greenwald et al. |
| 2004/0030927 A1* | 2/2004 | Zuk .................... 713/201 |
| 2004/0205374 A1 | 10/2004 | Poletto et al. |
| 2004/0220984 A1 | 11/2004 | Dudfield et al. |
| 2004/0236963 A1 | 11/2004 | Danford et al. |
| 2005/0039104 A1* | 2/2005 | Shah et al. ............. 714/776 |
| 2006/0047807 A1 | 3/2006 | Magnaghi et al. |

OTHER PUBLICATIONS

Ratul Manajan, Steven M. Bellovin, Sally Floyd, Vern Paxson, Scott Shenker, and John Ioannidis. Controlling High Bandwidth Aggregates in the Network. draft paper, Feb. 2001. http://www.aciri.org/pushback.

Stefan Savage, David Wetherall, Anna Karlin and Tom Anderson. Practical Network Support for IP Traceback. Proceedings of 2000 ACM SIGCOMM, Stockholm, Sweden, Aug. 2000. http://www.cs.washington.edu/homes/savage/traceback.html.

Steve Bellovin. ICMP Traceback Messages. AT&T Labs Research, Mar 2000. http://www.research.att.com/~smb/papers/draft-bellovin-itrace-00.txt.

Cisco. Characterizing and Tracing Packet Floods Using Cisco Routers. http://www.cisco.com/warp/public/707/22.html.

D. Senie. RFC2644 (BCP34), Changing the Default for Directed Broadcasts in Routers. IETF, Aug. 1999. http://www.ietf.org/rfc/rfc2644.txt.

P. Ferguson, D. Senie. RFC2827 (BCP38): Network Ingress Filtering: Defeating Denial of Service Attacks which employ IP Source Address Spoofing. IETF, May 2000. http://www.ietf.org/rfc/rfc2827.txt.

David G. Andersen, Hari Balakrishnan, and M. Frans Kaashoek, Robert Morris. The Case for Resilient Overlay Networks. Proc. of HotOS-VIII, Schloss Elmau, Germany, May 2001. http://nms.1cs.mit.edu/papers/ron-hotos2001.pdf.

Cisco. Web-Site Security and Denial-of-Service Protection. http://www.cisco.com/warp/public/cc/pd/si/11000/prodlit/cswsc_wi.htm.

Analysis of a Denial of Service Attack on TCP by Schuba et al Proceedings of the 1997 IEEE Symposium on Security and Privacy (IEEE Computer Society Press, May 1997).

Stefan Savage, David Wetherall, Anna Karlin and Tom Anderson. Practical Network Support for IP Traceback. Work in progress Technical Report UW-CSE-00-02-01. Date unknown. http://www.cs.washington.edu/homes/savage/traceback.html.

Web page entitled "Aggregate Based Congestion and Pushback" last modified Apr. 2001 Found at http://www.aciri.org/pushback.

D. Song et al., "Advanced and Authenticated Marking Schemes for IP Traceback", Proc. IEEE INFOCOM, Apr. 2001, pp. 878-880.

R. Stone, "CenterTrack: An IP Overlay Network for Tracking DoS Floods", Proceedings of 9th USENIX Security Symposium, Denver, CO, Aug. 2000, pp. 199-212.

H. Burch et al., "Tracing Anonymous Packets to Their Approximate Source", Proc. USENIX LISA 00, Dec. 2000, pp. 319-327.

"A System for Distributed Intrusion Detection", Snapp et al., Compcon Spring '91, Digest of Papers, Davis, CA, Mar. 1991, pp. 1 and 170-176.

Messmer, Apr. 2000, Network World.

Communications News, Jun. 2000, 37, 6, 48.

McFadden, Oct. 25, 2000, Ent. 5, 17, 22.

Greene, Feb. 16, 1998, p. 20.

Johnson, Nov. 27, 2000, Network World.

Martin, Aug. 14, 2000, Network World, p. 86.

Snyder, Jul. 19, 1999, Network World, p. 53.

Mell, P. et al., "Mobile Agent Attack Resistant Distributed Hierarchical Intrusion Detection Systems," RAID 1999, Sep. 99, pp. 1-8.

Mansfield et al., "Towards trapping wily intruders in the large", RAID 1999, Sep. 99, pp. 1-13.

Stallings, William, "Cryptography and Network Security", Principles and Practice, 2nd Edition, Intruders and Viruses, Chapter 15, pp. 478-501.

Roesch, Martin, "Snort—Lightweight Intrusion Detection for Networks", Proceedings of LISA XIII '99: 13th Systems Administration Conference, Nov. 7-12, 1999, pp. 229-238.

Ohta et al., "Detection, Defense, and Tracking of Internet-Wide Illegal Access in a Distributed Manner", Internet Society, Jul. 18-21, 2000, Retrieved from the Internet on Oct. 27, 2004: <URL: http://www.isoc.org/inet2000/cdproceedings/1f/1f_2.htm>.

* cited by examiner

| Time Slice | Fri | Thu | Wed | ... | Sun | Sat | Fri |
|---|---|---|---|---|---|---|---|
| Services provided by A (Web Server) to B (Desktop) | | | | | | | |
| WWW (TCP:80) | | | | | | | |
| Bytes / sec | 2k | 3k | 1k | ... | 2k | 4k | 3k |
| Packets / sec | 5 | 6 | 2 | ... | 5 | 9 | 5 |
| Conn's. / hr | .3 | .5 | .3 | ... | .2 | .3 | .3 |
| SSH (TCP:22) | | | | | | | |
| Bytes / sec | 1k | 3k | 4k | ... | 1k | 2k | 3k |
| Packets / sec | 2 | 6 | 9 | ... | 2 | 5 | 6 |
| Conn's. / hr | .3 | .5 | .3 | ... | .3 | .3 | .5 |
| Services provided by B (Desktop) to A (Web Server) | | | | | | | |
| SSH (TCP:22) | | | | | | | |
| Bytes / sec | 21k | 0 | 0 | ... | 0 | 0 | 0 |
| Packets / sec | 10 | 0 | 0 | ... | 0 | 0 | 0 |
| Conn's. / hr | 1 | 0 | 0 | ... | 0 | 0 | 0 |

FIG. 5

FLOW LOGGING FOR CONNECTION-BASED ANOMALY DETECTION

BACKGROUND

Networks allow computers to communicate with each other whether via a public network, e.g., the Internet or private networks. For instance, many enterprises have internal networks (intranets) to handle communication throughout the enterprise. Hosts on these networks can generally have access to both public and private networks.

Managing these networks is increasingly costly, while the business cost of network problems becomes increasingly high. Managing an enterprise network involves a number of inter-related activities including establishing a topology, establishing policies for the network and monitoring network performance. Another task for managing a network is detecting and dealing with security violations, such as denial of service attacks, worm propagation and so forth.

SUMMARY

According to an aspect of the invention, a method includes collecting flow records from flow collector devices that are disposed to collect flow information on a network. The method also includes determining whether a pair of flow records has the same source and destination flow identifiers, and were received within a predefined time period, to eliminate duplicate flow records received from the flow collectors, and store remaining, non duplicated flow records received from the plurality of flow collector devices.

The method produces a connection table that maps each node on the network to a record that stores information about traffic to or from the node from non-duplicated flow records. The connection table stores statistical information of packets on the network based on a time-slice basis. The time-period is about a time slice. A pair of flow records is the same if the flow records have the same source and destination flow identifiers including whether two flows have the same source and destination addresses, the same source and destination ports and the same protocol. The connection table includes a plurality of records that are indexed by source address, destination address, and time.

According to an additional aspect of the invention, a system includes a computing device. The computing device includes a computer readable medium storing a computer program that includes instructions to cause the computing device to collect flow records from a plurality of flow collector devices that are disposed to collect flow information on a network. The program also includes instructions to determine whether a pair of flow records has the same source and destination flow identifiers, and whether the records were received within a predefined time-period to eliminate duplicate flow records received from the flow collectors. The device stores remaining, non-duplicated flow records received from the plurality of collector devices.

According to a still further aspect of the invention, a computer readable medium storing a computer program including instructions that causes a computing device to collect flow records from a plurality of flow collector devices that are disposed to collect flow information on a network. The program also includes instructions to determine whether a pair of flow records has the same source and destination flow identifiers and the records were received within a predefined time-period to eliminate duplicate flow records received from the flow collectors. The program stores remaining, non-duplicated flow records received data from the plurality of collector devices.

One or more aspects of the invention may provide one or more of the following advantages.

Each time a connection is made between one host and another host the connection establishes a flow. Flow logging provides reports on actual flows in addition to data used to collect statistical profiles, e.g., time averaged statistics. Flow logging allows users to query for specific flow data over time frames rather than just querying a profile, e.g., a statistical average referenced over a specific time frame that is an average over time. The aggregator receives flow records and accounts for potential double counting of such flow records.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 5 is a block diagram depicting a record in the connection table.

DETAILED DESCRIPTION

Figure 1:
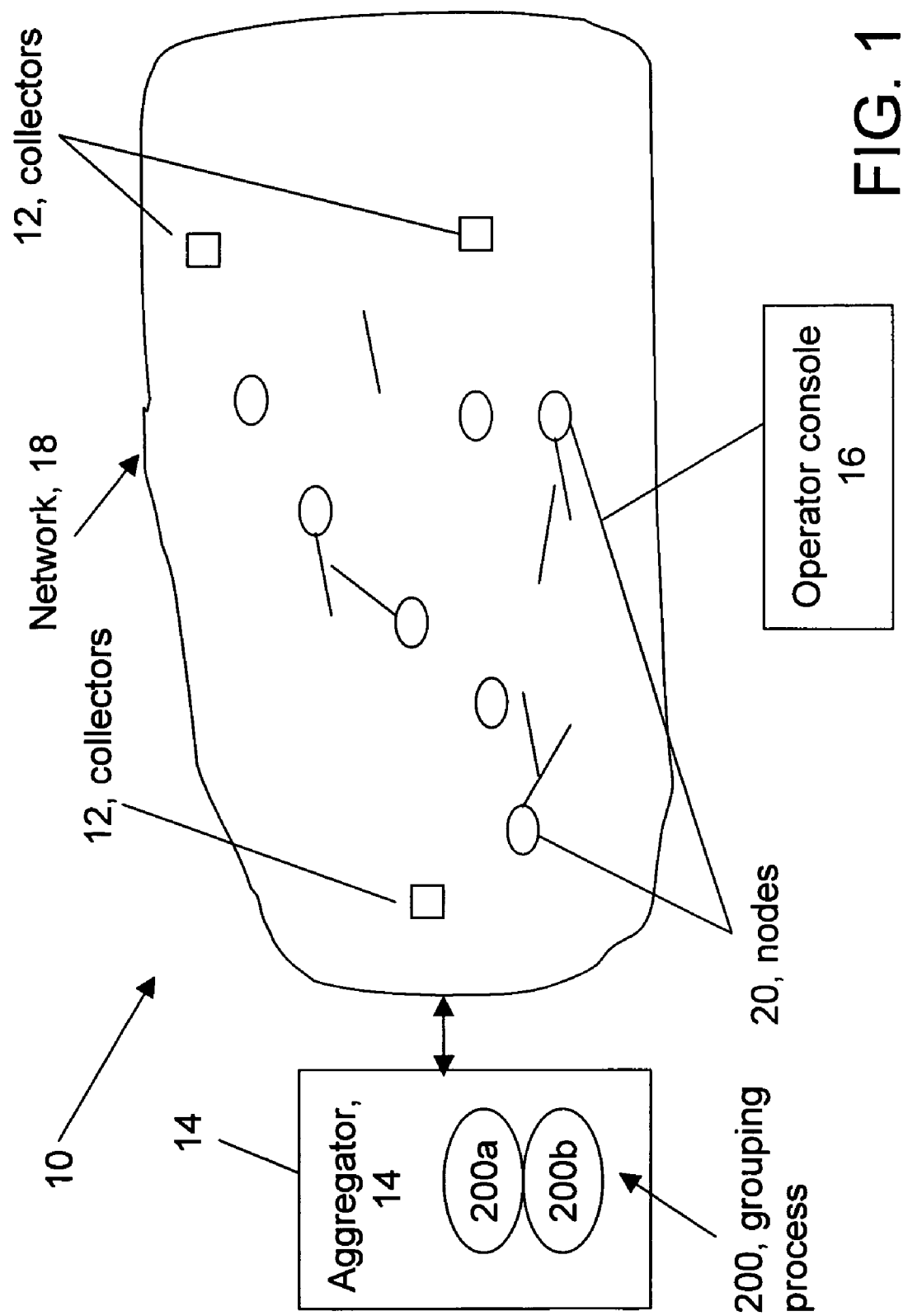
FIG. 1 is a block diagram of a network including anomaly detection.

Referring to FIG. 1, an anomaly detection system 10 to detect anomalies and process anomalies into events is shown. The anomaly detection system 10 can be used to detect denial of service attacks (DoS attacks), unauthorized access attempts, scanning attacks, worm propagation, network failures, and addition of new hosts in a network 18. The system 10 includes flow collector devices 12 and at least one aggregator device 14 and an operator console 16 that communicates with and can control collector devices 12 and the at least one aggregator device 14. The flow collector devices 12 and the at least one aggregator 14 are disposed in the network 18. The flow collector devices 12 connect to network devices, 15 e.g., switches, hosts, routers, etc. in line, or via a tap, e.g., using mirror, SPAN ports or other passive link taps. In some embodiments, the flow collector devices 12 collect information such as source and destination addresses, transport protocol, source and destination ports, flags, and length. The flow collectors 12 periodically, send the information to the aggregator 14 allowing the aggregator 14 to store a record of the number of packets, bytes, and connections between every host pair observed by the flow collector 12, broken down by port and protocol. In addition, the flow collector devices 12 send summary information concerning flags seen on TCP packets. The flow collector devices 12 also collect connection information to identify host connection pairs. In other embodiments, the flow collector devices 12 are flow probes 12a that collect data regarding flows seen by devices on the network 18.

The aggregator 14 can also execute a grouping process 200 that efficiently partitions hosts on the network into groups in a way that exposes the logical structure of the network 18. The grouping process 200 assigns nodes to groups and includes a classification process 200a that classifies hosts by groups and a correlation process 200b that correlates groups.

Figure 2:
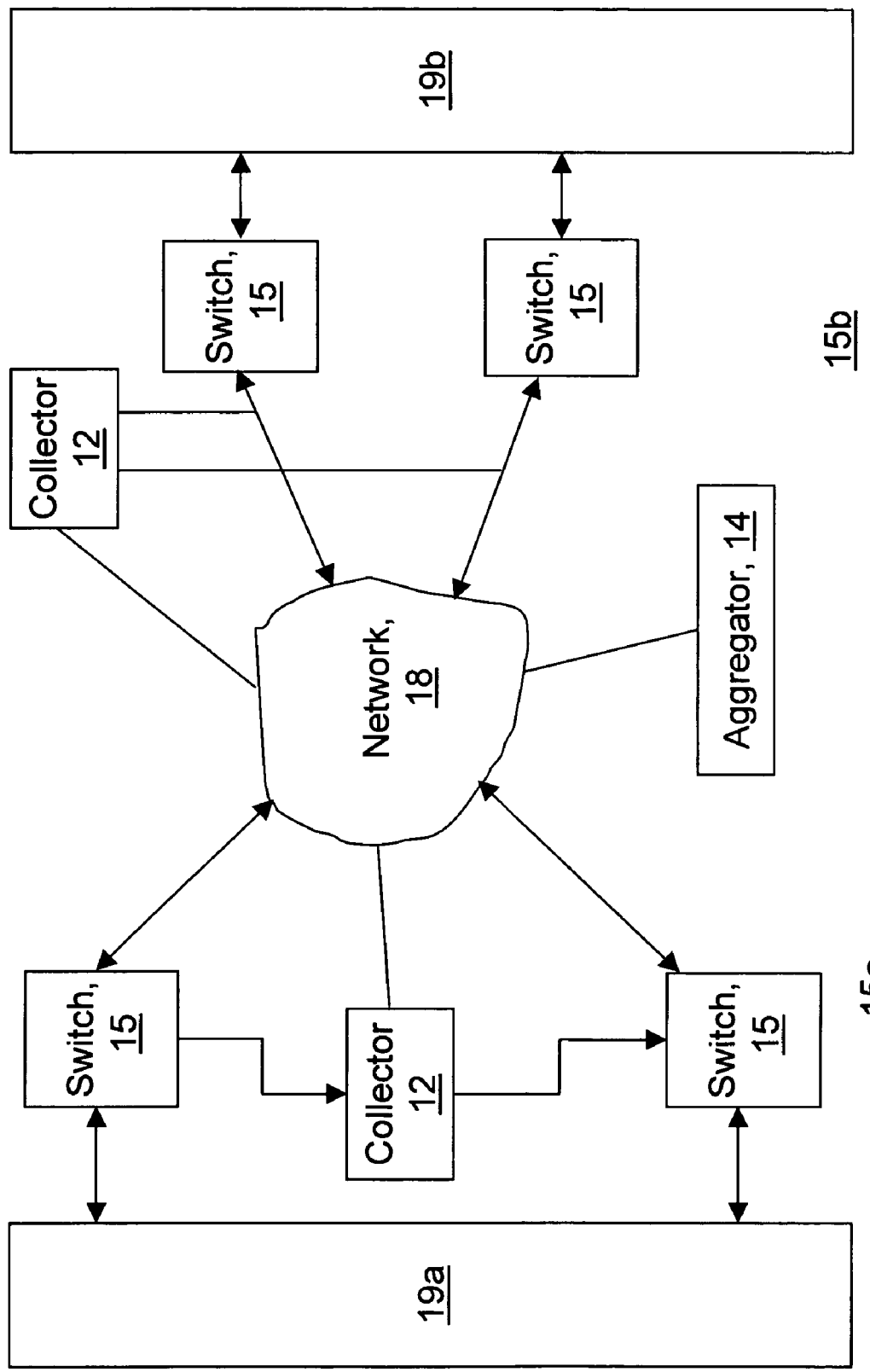
FIG. 2 is a block diagram depicting exemplary details of anomaly detection.

Referring to FIG. 2, flow collector devices 12 are disposed to sample or collect information from network devices 15, e.g., switches, as shown. The flow collector devices 12 or probes 12a, i.e., generally collector devices 12, send flow data information to the aggregator 14 over the network 18. The collectors 12 in one configuration sample all traffic from a downstream network 19a provided that the traffic traverses the switches 15, whereas in another configuration the collectors 12 sample traffic from downstream network 19b that enters and leaves the switches 15.

The architecture is based establishing flow records from flows received from the collectors 12 and also a connection table based on the flows. The flow records are actual flows whereas the connection table stores statistical data of bytes/second, packets/second, connections/hour statistics, and so forth over various periods of time, as discussed below allowing comparisons to historical data. The data collectors are devices that are coupled actively or passively on a link and collect the above-mentioned flows. Data collectors 12 can be connected via a tap or can span port on a monitored device (e.g., router, etc.) over intervals of time. Over such intervals of time, e.g., every 30 seconds, the data collectors 12 send flow records to the aggregator 14. The flow records are sent from the collector to the aggregator over the network being monitored or over a hardened network (not shown). Preferably the flow records are sent using a reliable protocol such as Multi-Point Control Protocol "MPCP" or other reliable protocols to insure either delivery of all flow records or indication of missing records.

There are a defined number of sources, a defined number of destinations, and a defined number of protocols on a given network. Over a defined interval (typically 30 seconds), the data collectors 12 monitor all connections between all pairs of hosts and destinations using any of the defined protocols. At the end of each interval, these statistics are summarized and reported to the aggregator 14. The values of the collected statistics are reset in the data collectors after reporting. The number of connections between ports using an unknown protocol is also monitored.

If more than one collector 12 saw the same source and destination communicating, the following could have occurred. The collectors 12 could be in parallel and each saw a portion of the communication. Alternatively, the data collectors could be in series and both collectors 12 saw the entire communication. Given the rate at which parallel connections may change, the aggregator assumes that the collectors 12 are in a series connection. The maximum of two received values is taken as a value for the connection and it is assumed that the lower value reflects dropped packets. Other arrangements are possible. Such a process to detect potential double counting is discussed in FIG. 7.

Figure 3:
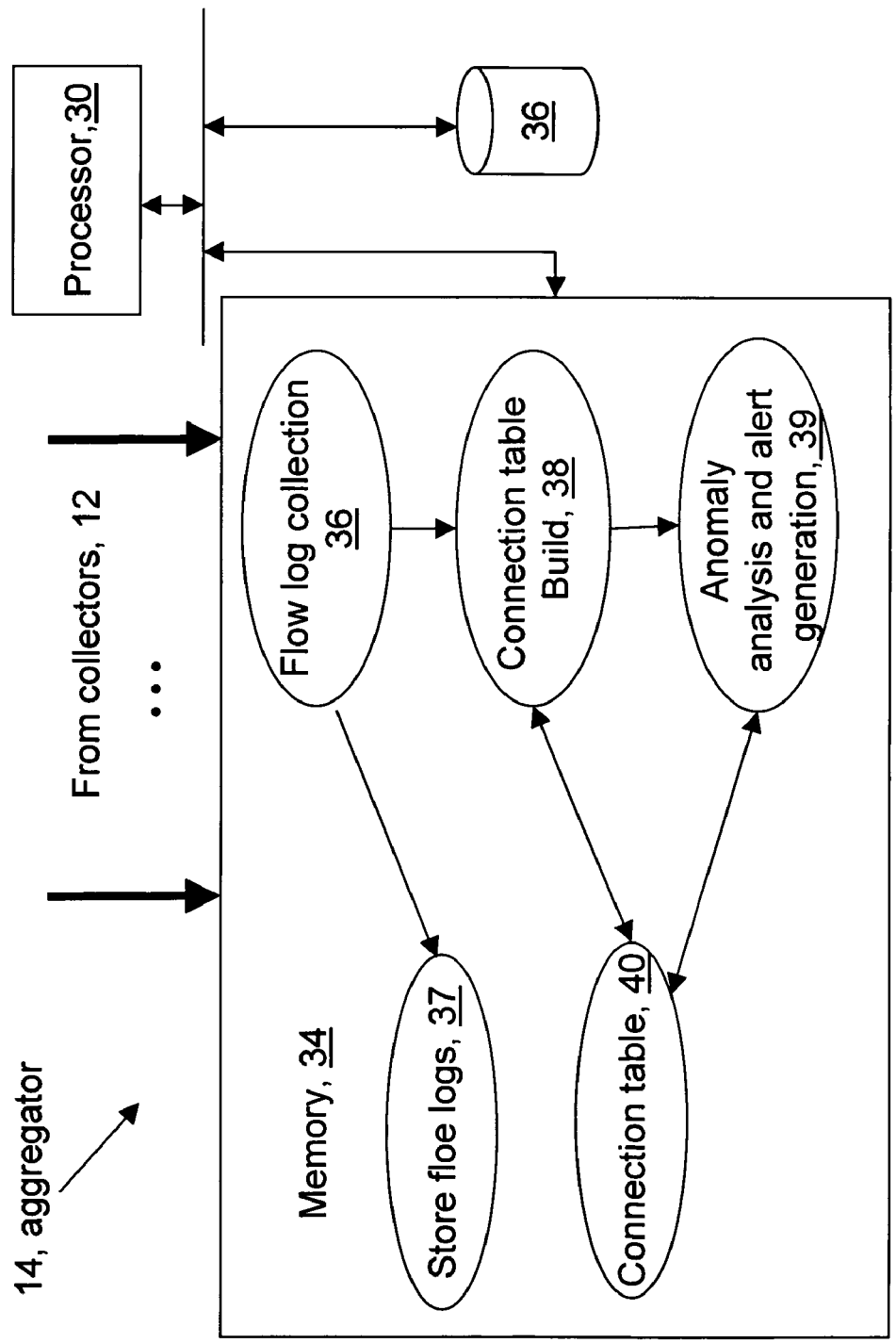
FIG. 3 is a block diagram depicting an aggregator.

Referring to FIG. 3, the aggregator 14 is a device (a general depiction of a general purpose computing device is shown) that includes a processor 30 and memory 32 and storage 34. Other implementations such as Application Specific Integrated Circuits are possible. The aggregator 14 includes a process 36 to collect flow data from flow collectors 12 or probes 12a, a process 37 to store flow records, and a process 38 to produce a connection table 40 from the flow data or flow records. In addition, the aggregator includes anomaly analysis and event process 39 to detect anomalies and process anomalies into events that are reported to the operator console or cause the system 10 to take action in the network 18. Anomalies in the connection table can be identified as events including denial of service attacks, unauthorized access attempts, scanning attacks, worm propagation, network failures, addition of new hosts, and so forth. Flow records are the main source of data for the connection table discussed below. From the flow records long and short connection tables for heuristics and so forth are produced. Flow records are also recorded on disk (in flow logs) and used to compute aggregate statistics for reporting and to document network activity over time (for forensic purposes).

Figure 4:
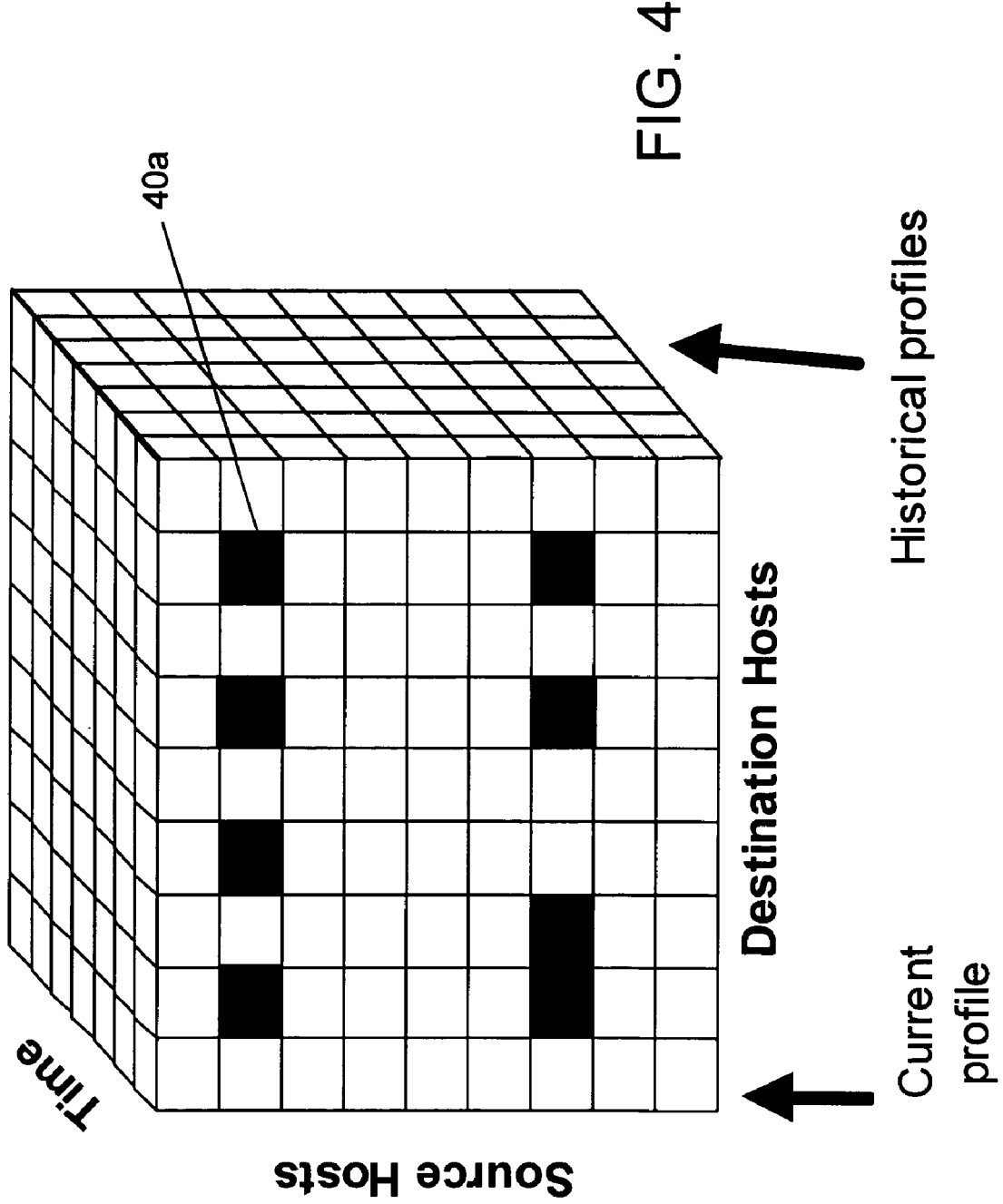
FIG. 4 is a block diagram depicting a connection table.

Referring to FIG. 4, the connection table 40 is a data structure that maps each host (e.g., identified by IP address) to a "host object" that stores information about all traffic to or from that host. In one implementation of the table, source address is one dimension, destination is a second dimension and time is a third dimension. The time dimension allows a current record and historical records to be maintained.

Using IP addresses to uniquely identify hosts could be inadequate in environments with Dynamic Host Configuration Protocol (DHCP) assignments. Thus alternatively, the administrator can configure a DHCP server to produce a MAC address to IP address map. The MAC address to IP address map is sent as a flat file to the aggregator 14. Thereafter, when a collector 12 reports an IP address and counter to/from values, the aggregator 14, for each IP address checks in the most recent map. If the IP address is found in the map, then the host is managed by a DHCP server, and the host ID is the host's MAC address, otherwise the Host ID is the host IP address.

The host object, e.g., 40a of a host "A" also maps any host (IP address) "B" with which "A" communicates to a "host pair record" that has information about all the traffic from "A" to "B" and "B" to "A". This two-level map enables the system 10 to efficiently obtain summary information about one host and about the traffic between any pair of hosts, in either direction.

Hashing is used to "lookup or update" information about any host or host pair on the network 18. The connection table 40 includes additional structure to allow efficient traversal of all hosts or host pairs and supports efficient representation of groups of related hosts, e.g., a role grouping mechanism as discussed below. Alternatively, the role grouping can be stored separately from the connection table.

The connection table uses a hash map from host identifiers (IP or MAC addresses) to "host" objects, as discussed. Each Host object maintains aggregate traffic statistics for the associated host ("H"), and a hash map (a 2nd level hash map) from host identifiers (IP addresses) of peers of host H (i.e., hosts that host H had communicated with) as "HostPair" objects. Each HostPair object maintains traffic statistics for each pair of hosts (H and H's peer). To allow more efficient, analysis HostPair objects are duplicated across Host objects. For instance, the HostPair "AB" is maintained both in the hash map within Host "A" and in the hash map within Host "B." Group information is embedded in the connection table, with each Host object storing information about the group that the associated host belonged to. The connection table maintains a list of all groups and their member hosts.

Figure 4A:
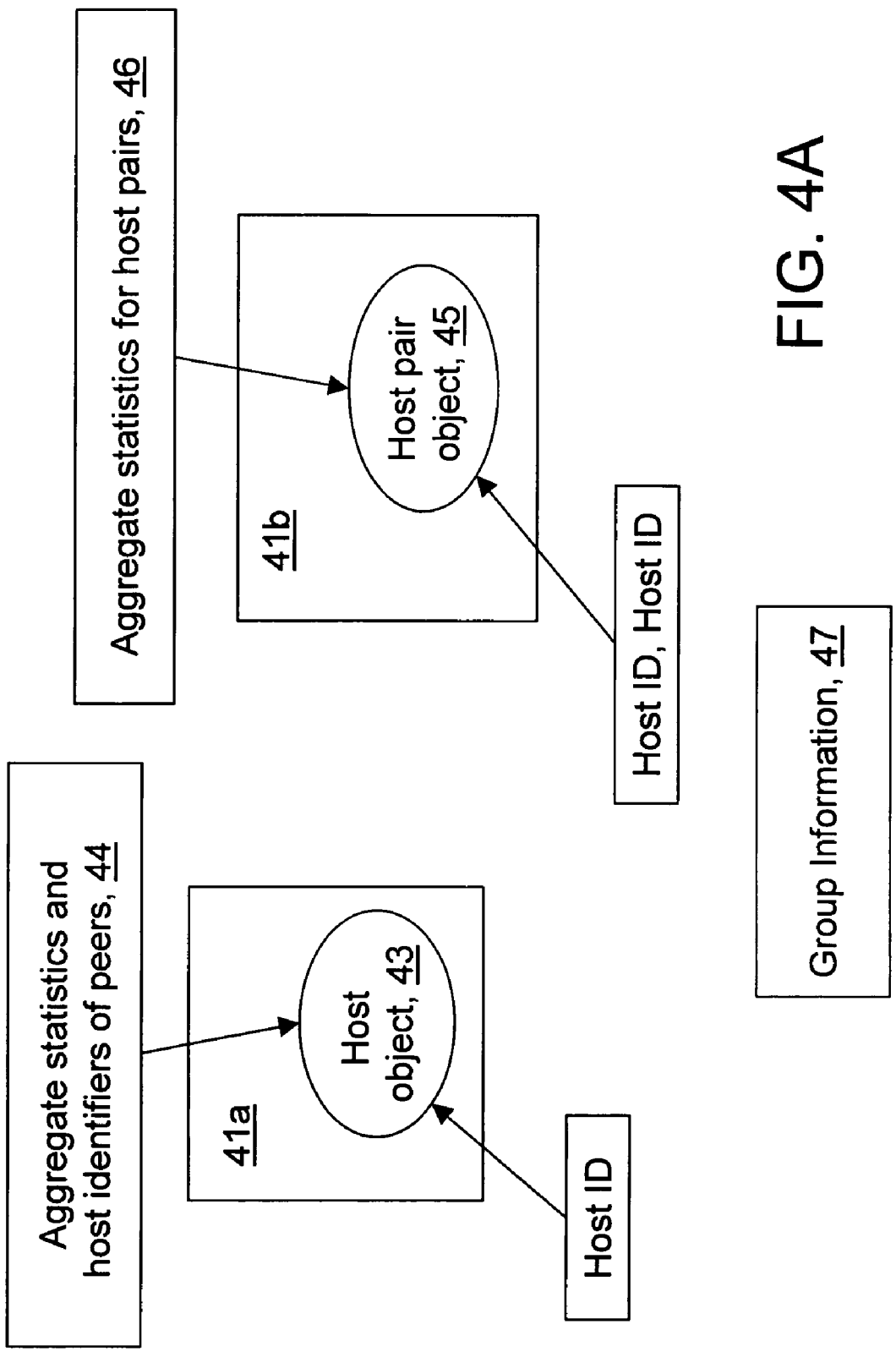
FIG. 4A is a block diagram of an alternative connection table.

Referring to FIG. 4A, in an alternative implementation 41 of the connection table 40, the connection table 41 is split into two hash maps 41a and 41b, a "host hash" map 41a and a "host pair" hash map 41b. The "host hash" map 41a maps host identifiers (IP or MAC addresses) to new Host objects 43. Each new Host object 43 has the aggregate traffic statistics for the associated host, as well as a list of the host identifiers (IP or MAC addresses) of all the peers of that host 44. The "host pair" hash map 41b maps pairs of host identifiers to Host Pair objects 45 that maintain traffic statistics 46 for pairs of hosts. In this implementation Host Pair objects 45 need not be longer duplicated, as discussed above.

For example, if host A and host B communicate, then the host map has a Host object 43 for A that lists B as a peer, the host map has a Host object 43 for B that lists A as a peer, and the host pair map has a Host Pair object 45 for AB. Group information is stored in a separate table 47 that is loaded, saved, and otherwise managed separately from the traffic statistics in the connection table. It does not need to be in memory unless it is actually needed.

Factoring out the group information and moving from many hash maps (top level map, plus one 2nd level map per Host object) to just two makes this implementation of the connection table more compact and decreases memory fragmentation, improving aggregator performance and scalability.

In one embodiment, only "internal hosts" (defined based on configurable IP address ranges) are tracked individually as described above. The aggregator 14 buckets all other ("external") hosts into a fixed number of bins according to 8- or 16-bit CIDR (Classless Inter-domain Routing) prefix. This approach preserves memory and computational resources for monitoring of the internal network 18 but still provides some information about outside traffic. Other arrangements are possible, for instance bucketing can be turned off if desired, so that each external host is tracked individually.

Referring to FIG. 5, exemplary contents of the host object 40a are depicted. Similar statistics can be collected for host objects 43. As shown, the contents of the host object 40a in the connection table 40 include a measure of the number of bytes, packets, and connections that occurred between hosts during a given time-period, here on a daily basis. Data is broken down per-protocol for every well-known transport protocol (e.g., TCP, UDP, ICMP, and the 132 others defined by the "Internet Assigned Numbers Authority" and for several hundred well-known application-level protocols (e.g., SSH, HTTP, DNS, and so forth). For every application-level protocol, and for every pair of hosts "A" and "B", the Connection Table stores statistics for traffic from host A to host B and from host B to host A both for the case where "A" is the server and the case where "B" is the server. Unknown protocols are counted together.

Since most hosts only use a small fraction of the well-known protocols, the footprint of the data structure is kept manageable by storing protocol-specific records as (protocol, count) key-value pairs. Further, since the protocol distribution is typically skewed (a few protocols account for the majority of traffic on each host), key-value pairs are periodically sorted by frequency to improve amortized update time.

Individual host records have no specific memory limit. If a particular host connects with many other hosts and uses many protocols, all that information will be recorded. However, the total memory used by the aggregator 14 is bounded in order to avoid denial of service attacks on the aggregator 14. For example, an attacker spoofing random addresses can cause the Aggregator 14 to allocate new host structures and quickly consume memory. If an aggregator ever exceeds a memory utilization threshold "m_{hi}", it de-allocates records until its memory utilization falls below "m_{hi}". Several different algorithms can be used for picking records to de-allocate. Some of the algorithms that can be used include random eviction, picking low-connectivity hosts first, high-connectivity hosts first, and most recently added hosts first. Similar measures are also taken on the probes 12 to ensure high performance and limit Probe-Aggregator communication overhead.

Figure 6:
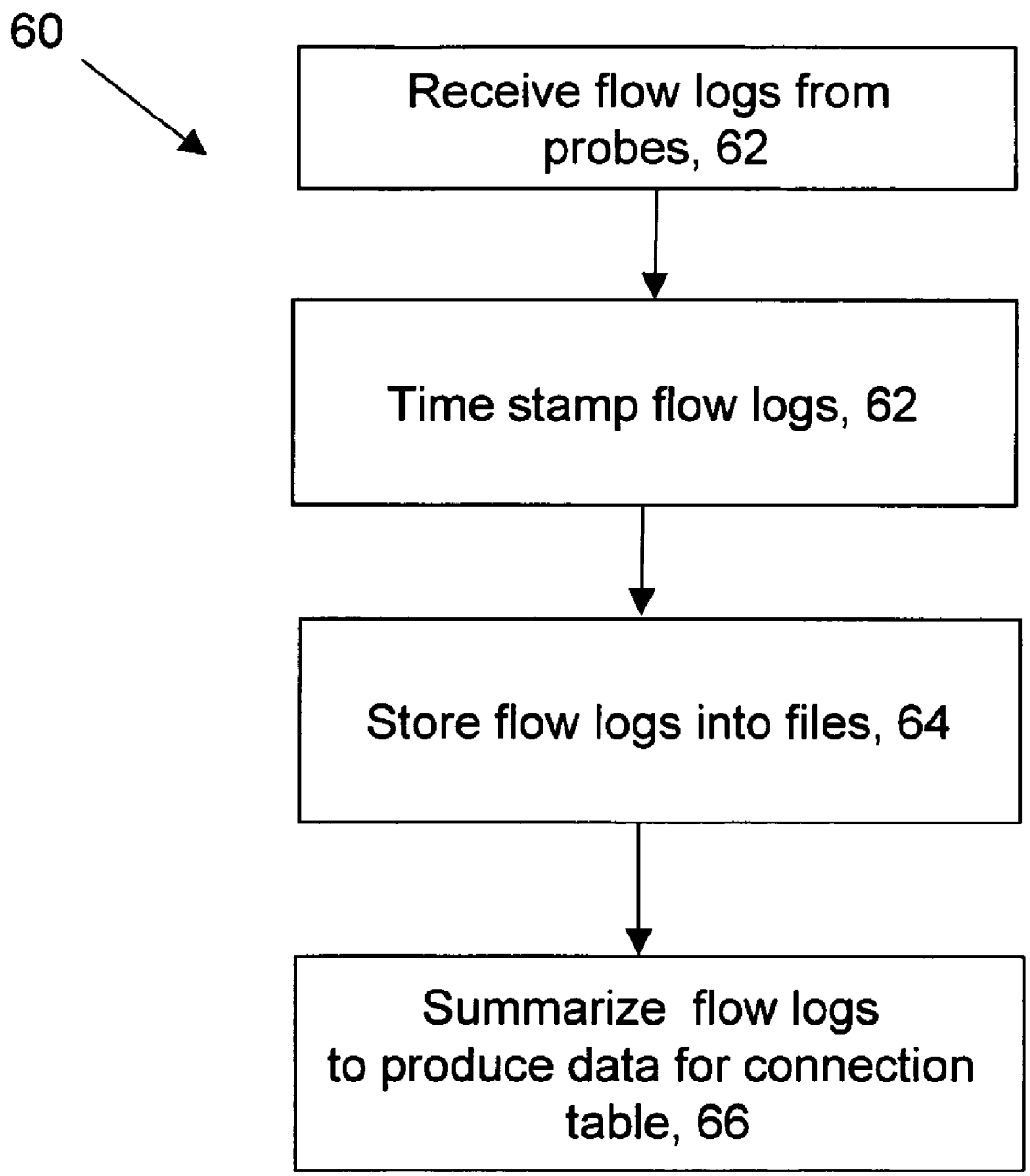
FIG. 6 is a flow chart depicting a flow logging process.

Referring to FIG. 6, a flow logging process 60 is shown. A flow typically corresponds to half of a connection. A connectionless protocol such as UDP could be used. Each (bi-directional) TCP connection is treated as two separate flows, one in each direction, and stored as two separate flow records. That is, each time a connection is made between one host and another host in the network monitored by the system 10, that connection establishes a flow. The flow logging process 60 provides reports on actual flows in addition to profiles, e.g., time averaged statistics in the connection tables, as mentioned above. That is, flow logging allows users to query for specific flow data over time frames rather than just querying a profile, e.g., a statistical average referenced over a specific time frame that is an average over time.

The flow logging process 60 receives 62 flow records from data collectors 12, or flow probes 12a, for example. The information is time stamped 64 and stored 66 in a file. The flow logging process summarizes 66 the flow records to produce statistical data for the connection tables as described in FIGS. 4-5. The data for the flow records are records of every flow that was seen by the data collectors. In addition to a time stamp, the flow records include a record of any flags that occurred during the connection. A flow record includes a. Source and destination address and port
    b. IP protocol
    c. Timestamp
    d. Information about what (if any) TCP flags were used by the flow
    e. Number of bytes and packets transferred
    f. Information about which host (source or destination) is the client and which is the server for those data collectors that have the capability to provide such information.
    g. A unique flow record ID that can be used to reference application-specific information (for example, that an FTP data flow corresponds to a particular FTP control flow) server for those data collectors that have the capability to provide such information.

Flows are received via the data collectors, which can be flow probes, 12a such as Netflow® (Cisco) devices and so forth or data collectors 12. The aggregator 14 constructs flow records from the flows, stores the flow records in a file system that is indexed for random access by time. The file can be segregated into fixed units of a particular file size, e.g., 300-500 Mbytes files. The aggregator 14 can keep a fixed number of those files with the oldest of the files being overwritten. The aggregator can include a storage system to keep a larger portion of the files for a longer period of time. Alternatively, the aggregator can offload the file to a separate storage system to store the flow records. The data can be also be compressed.

Figure 7:
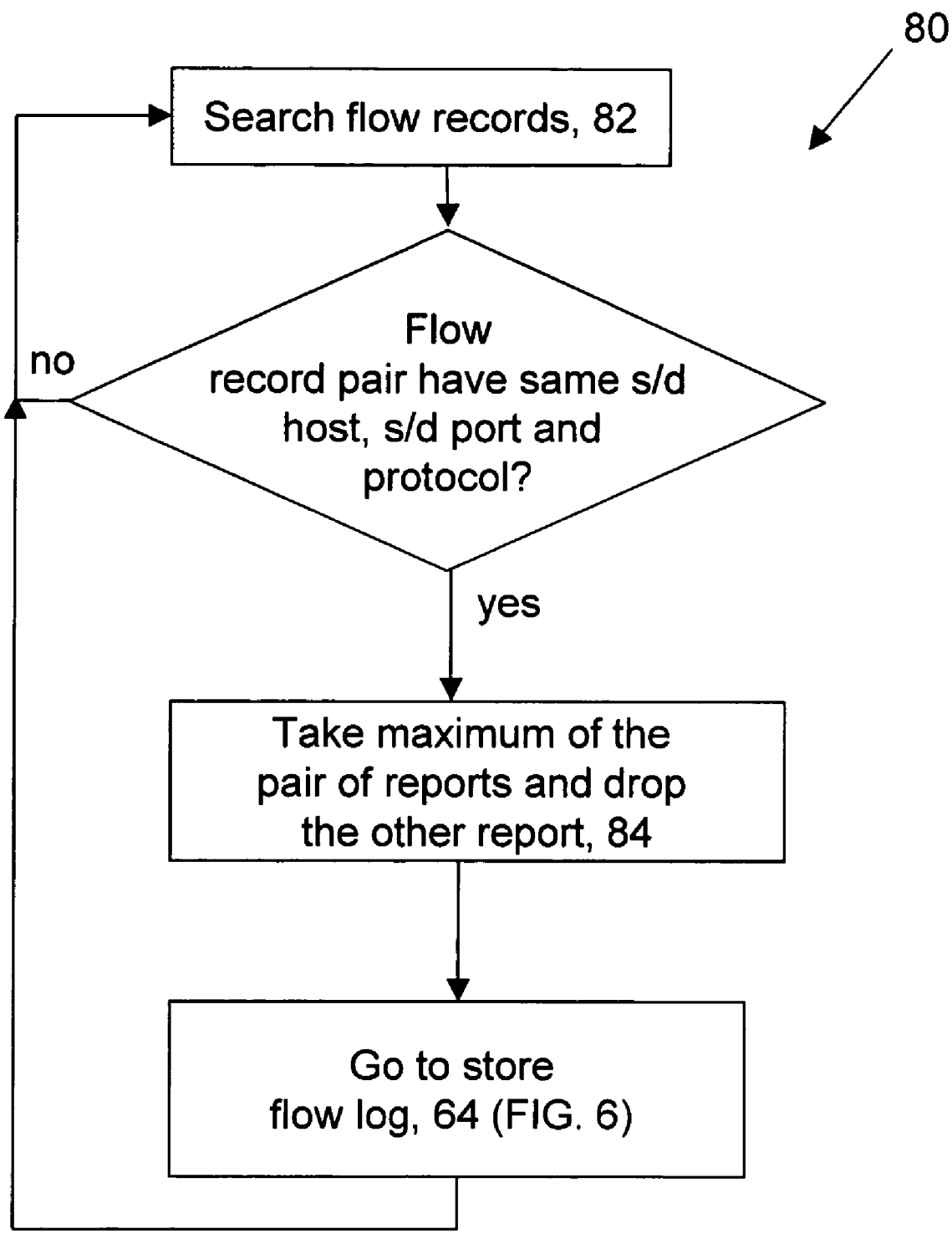
FIG. 7 is a flow chart depicting a process to eliminate duplicate flow records.

Referring to FIG. 7, the aggregator 14 receives all of the flow records. It is possible that more than one collector reports the same flow record over a discrete time period, e.g., a time slice as developed below. The aggregator includes a process 80 that accounts for potential double counting of such flow records. The aggregator 14 operates over discrete time increments as with a time slice. The aggregator 14 searches over the flow records. If two sensors each report a flow record 84 that has the same source and destination host, source and destination port and protocol, e.g., IP protocol, then the reports from the two will be considered the same report 84 and the aggregator will take 86 the maximum of the two reports, rather than adding the records together. That is, the flow record includes the number of bytes, packets, and connections that are recorded for the flow identified by source and destination host, source and destination port and protocol during a certain time-slice. If two or more flow records for the same flow appear in one time-slice (from different collectors or probes), the process picks the report that would have maximum number of bytes, maximum number of packets, and maximum number of connections. The aggregator 14 will store the maximum of the pair of reports and discard the other report considering the other report to be a duplicate report that may have had dropped packets, etc.

This situation can occur in two cases. In one case, two network devices, e.g., routers each have a sensor, e.g., flow probe or data collector, installed. The routers are logically connected in a virtual path that places them in series or in-line. Thus, each router sees the same traffic and the data collectors on each router see the same traffic and hence produce two flow records that are sent to the aggregator. A second case can arise where one network device, e.g., router can take two different paths to a destination device with each path including a different data collector. In that instance, the router will generally send traffic over one of those paths to the destination. The collector on the network device that sees the traffic will produce flow records and send the flow records to the aggregator 14. However, from time-to-time the router may change the path it takes to send data through the network to the destination, in which case the data may travel through the other data collector. That change in the path ("flipping") can place the two data collectors in parallel for a flow and could result in a duplicate record being developed. This situation however is much less likely to happen than having the two sensors logically in series or in-line.

Thus, given the rate at which parallel connections may change, the aggregator assumes that the data collectors are in a series connection "in-line". The maximum of the two received values is taken as a value for the connection and it is assumed that the lower value reflects dropped packets. Other arrangements are possible.

Figure 8:
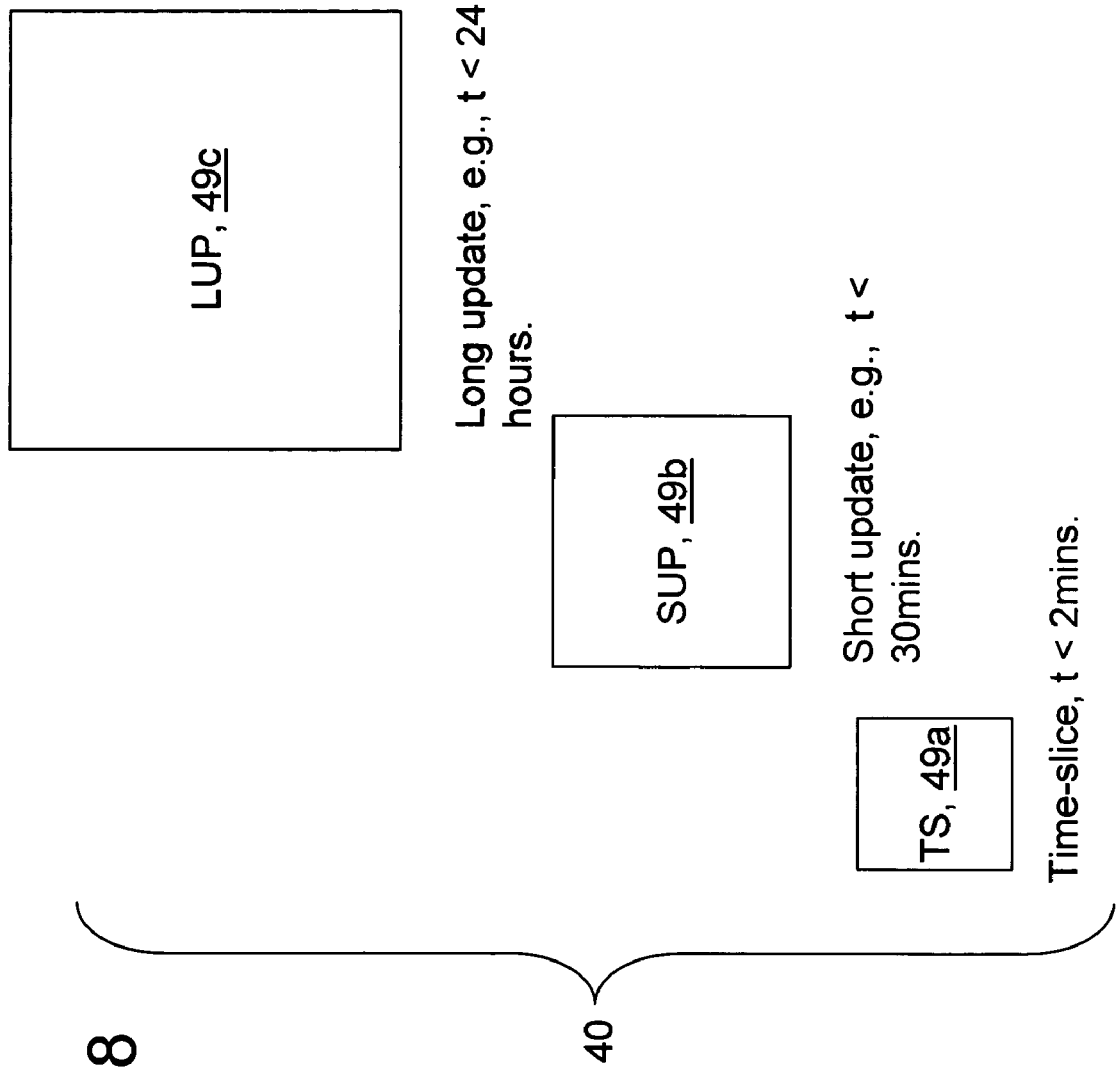
FIG. 8 is a block diagram depicting an arrangement of connection tables.

Referring to FIG. 8, the aggregator 14 uses different connection tables 40 to track data at different time scales. A first connection table 49a is a time-slice connection table that operates on the smallest unit of time, e.g., (a time-slice). A time-slice can be e.g., less than 30 seconds to maybe several minutes. The time-slice connection table is the sum of records received from all collectors during that the time-slice period, corrected for duplicates.

Aggregator analysis algorithms 39 operate primarily on a short update period (SUP) Connection Table 49b, which is the sum of time-slices across a period of, e.g., 10 to 30 minutes. A set of SUP connection tables is summed into a third connection table 49c covering a long update period (LUP), e.g., 2 to 24 hours. For each recorded parameter (such as TCP bytes from host "A" to host "B"), SUP and LUP tables track both the sum and sum of squares of values of the recorded parameter. These two values allow the aggregator to compute both the mean and variance of the recorded parameter across the table's time period. Given "N" samples $x_1, x_2, \ldots x_n$ mean is sum over the period of the samples divided by the number of samples. The variance is derived from the mean and sum of squares.

At the end of each long update period, that period's values are merged into a connection table that includes historical information for the corresponding period of the week. Merging uses the equation below for each value in the connection table. For instance, a LUP table covering the period 12 pm to 6 pm on a Monday is merged into a connection table with historical information about Mondays 12 pm to 6 pm. Values in the connection table are stored as exponentially weighted moving averages (EWMAs). At time "t", a new value "$x_t$" (from the LUP table, for example) is added to the EWMA for time "t−1", denoted by "$m_{t-1}$", to generate a new EWMA value according to the following Equation:

$$m_t = \alpha x_t + (1-\alpha) m_{t-1}$$

where $\alpha$ can be tuned to trade off responsiveness to new values against old ones. EWMAs provide a concise way of representing historical data (both values and variance) and adapting to gradual trends. Recent data is compared to historical profiles from the same,time of, an historical time span, e.g., a week because the week is the longest time span that generally shows well-defined periodicity in traffic patterns. By spanning a week, the approach covers diurnal cycles and week/weekend cycles. Recurring events with longer time periods, for example, monthly payroll operations, are less likely to show similarly well-defined patterns.

A collector 12 should handle relatively high rates of network traffic. As the network grows and traffic volume increases, additional collectors 12 can be deployed in appropriate locations to tap new network traffic.

Bucketing and Internal vs. External Addresses are included in records that are produced by the system. Bucketing may be performed for profile data (and for the connection tables, SUP, LUP), but not for flow records.

In reports that list flows (limited by time, entities or services) each flow's data (such as packets and bytes sent) will be listed from t0 to t1—the time interval chosen by the user. There will be a "show details" icon or some other clickable area that will lead to a popup which will display the information about the entire flow, from flow start to flow end.

Representing FTP Connections/Flows

FTP protocol has two types of connections, control and data. FTP control connections are always made from a client port to a well-known server port (usually, ftp 21/tcp). These connections are handled as any other connections, e.g., no special handling. Data connection may originate either from FTP client or from FTP server, and be either to a well-known port (ftp-data, 20/tcp), or to any other port. These connections will be handled differently in connection-table-based reports and in flow-logging-based reports.

In the connection table (current/profile discussed above), all FTP data connections are made to ports other than "port 20" are summed up in a special "bucket" that does not correspond to any real port. The name of the bucket is "ftp-multiport". These data connections are treated as if the destination port is "20/tcp." However, the direction of the connection is preserved (all FTP passive mode connections are represented as "from FTP client to FTP server", "port tcp/ftp-multiport20/tcp," and FTP active mode connections are represented as "from FTP server to FTP client, port tcp/ftp-multiport20/tcp.") Actual port numbers for FTP data connections are thus not stored in the connection table.

However, in the flow records, each FTP data flow is logged separately, with the actual port numbers. In addition, each FTP data flow is marked as a FTP control flow and is referenced by the FTP control flow that caused the flow. A flow logging user interface can represent the flow in a hierarchical manner as:

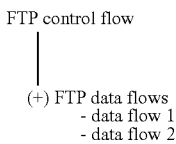

FTP control flow (+) FTP data flows
    - data flow 1
    - data flow 2

Clicking on a (+) will allow the user to "expand" data flows and to see all of the data flows, or to hide the data flows and see only a "data flows" record that summarizes the hidden flows.

Additionally, all ephemeral FTP traffic can be accessed on the UI via a fake 'pseudo-service' called ftp-multiport Flow information is generated on sensors and transferred to the aggregator 14 via a secure protocol e.g., MPCP. The sensor is generally one of many such sensors that are disposed in the network. As shown, the aggregator constructs the connection table as well as counters and records. The contents of a flow include:

| Record field | byptes (size) | Comment |
|---|---|---|
| src | (4) | |
| dst | (4) | |
| proto | (2) | |
| sp | (2) | |
| dp | (2) | |
| bytes | (8) | |
| packets | (8) | |
| flags | (1) | // cumulative OR of flags seen an the flow |
| first_ts | (4) | // timestamp the first packet seen |
| last_ts | (4) | // timestamp the last packet seen |

There are two flow records per bi-directional flow, the flow collector element need not be connection direction aware, or client-server aware. Some embodiments can use compression for sending flow records between the sensor and the aggregator 14. Various compression techniques can be used.

The flow records are collected on the data collectors described above using the techniques described. The data collectors keep track of flows and send messages about all active flows for every time slice. The flags, "new flow" and "end of flow" are included in data sent to the aggregator. The flow collector can have a maximum number of flows per slice setting to thwart denial of service attacks on the flow collectors.

Figure 9:
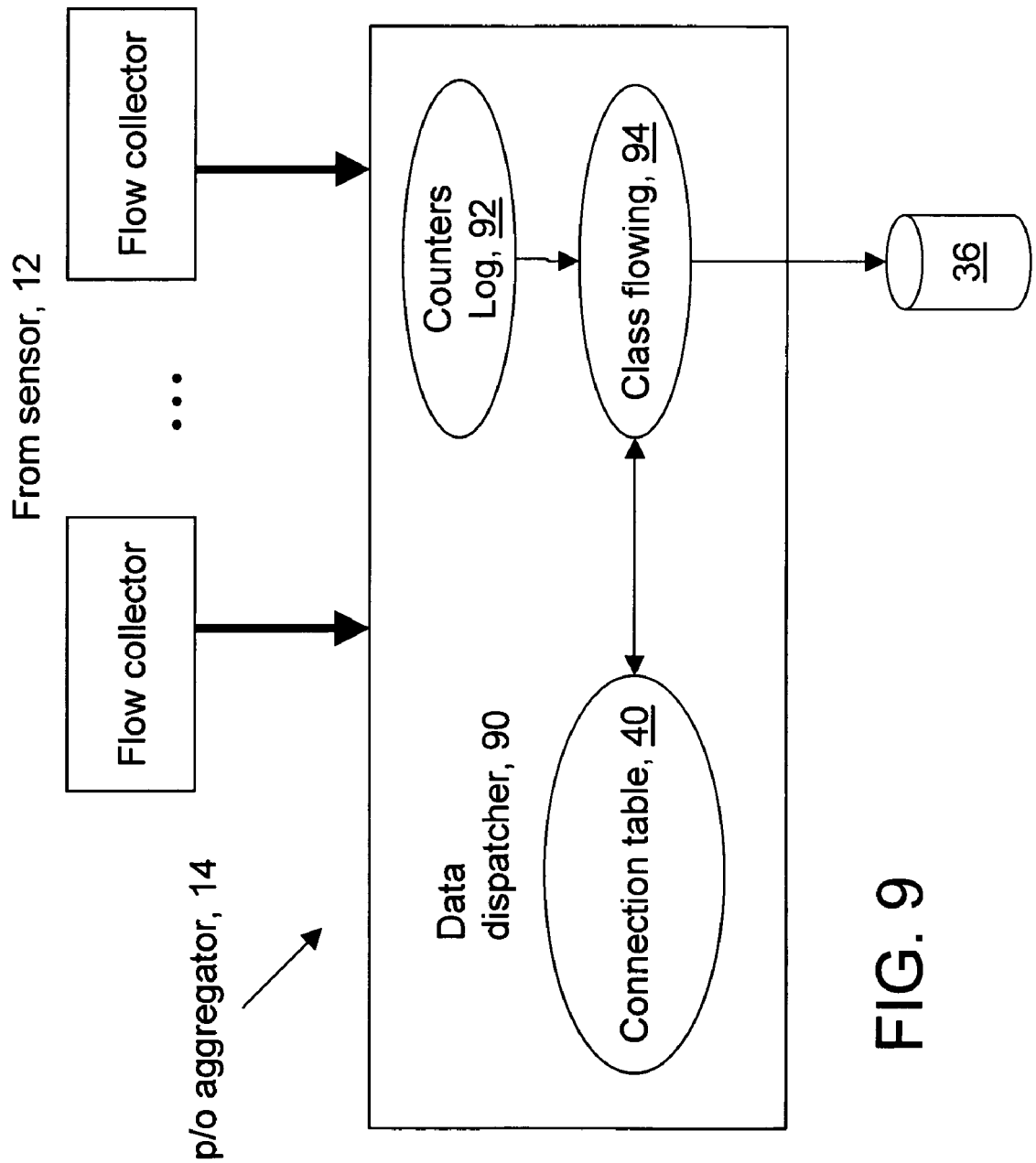
FIG. 9 is block diagram depicting additional features of the aggregator.

Referring to FIG. 9, additionally the aggregator includes a Data Dispatcher (DD) 90. The data dispatcher 90 receives flow records from the sensors 12 (FIG. 1) and logs the records in the flow log (described below). The Data Dispatcher (DD) 90 produces counter logs, e.g., IP_Counter logs 94 and also populates the connection table 40. The data dispatcher handles bucketing by accessing INTERNAL_ADDRESSES in the packets, direction of connection, client/server relationships and handles HostPairCounters, before populating the connection table with the statistical data. The data dispatcher 90 includes a FlowLog class 94 to encapsulate data, to store records into the flow log database 36. One implementation is as a SQL/"COPY FROM" wrapper.

As mentioned earlier the flow log is broken up into a series of one or more files. The flow log includes a series of flow records stored in order of increasing time via the timestamp. Within a given time window (for example, 3 minutes), flows may be out of order, but a flow occurring outside of that time window after another flow is guaranteed to appear later in the flow log. The flow log uses time-based index files that point into the flow log to allow random access by time. The index files have one entry for every N seconds. Thus, given the start time of the flow log the entry point for a particular time can be found. Each entry in the index files point to the location in the flow log where flow records for the corresponding time begin.

During each time slice (~1 min) the flows arrive into data dispatcher from the sensors. The data dispatcher aggregates information about the flows from all of the sensors and places the flows into a Short Flow Store. While doing this data dispatcher also resolves missing information, such as host ids and client/server relationships, as discussed above. At the end of a time slice period, the data dispatcher merges information from Short Flow Store into a Long Flow Store much as the connection table approach discussed above. The data dispatcher expires those flows in Long Flow Store for which it did not receive any information for a timeout time.

A number of embodiments of the invention have been described. Nevertheless, it will be understood that various modifications may be made without departing from the spirit and scope of the invention.

What is claimed is:

1. A computer implemented method, comprising:
receiving, at an aggregator, flow records from a plurality of flow collector devices that are disposed in a network to collect flow information;
prior to storing the flow records in the aggregator,
in response to determining that a first flow record and a second flow record, received at different flow collectors within a predefined time-period, have the same source and destination flow identifiers, and that the number of bytes, packets, and connections in the first flow record is greater than the number of bytes, packets, and connections, respectively, in the second flow record,
selecting the first flow record for storing in the aggregator, and
discarding the second flow record;
storing non-discarded flow records in the aggregator; and
creating, at the aggregator, a connection table comprising the stored flow records indexed by source and destination flow identifiers.

2. The method of claim 1, wherein the connection table maps each node on the network to a record that stores information about traffic to or from the node.

3. The method of claim 1, wherein the connection table stores statistical information of packets on the network based on a time-slice basis.

4. The method of claim 1, wherein the predefined time-period is a time slice.

5. The method of claim 1, wherein determining that two flows have the same source and destination flow identifiers includes determining that the two flows have the same source and destination addresses.

6. The method of claim 1, wherein determining that two flows have the same source and destination flow identifiers includes determining that the two flows have the same source and destination ports.

7. The method of claim 1, wherein determining that two flows have the same source and destination flow identifiers includes determining that the two flows have the same protocol.

8. The method of claim 1, wherein the source and destination flow identifiers include the source and destination addresses or ports.

9. The method of claim 1 wherein the source and destination statistics include the source and destination addresses, source and destination ports, and protocol.

10. The method of claim 1, wherein the flow records in the connection table are indexed by time.

11. The method of claim 1, wherein the flow records in the connection table are indexed by source address, destination address and time.

12. A system comprising:
a computing device including a non-transitory computer readable medium storing a computer program that includes instructions to cause the computing device to:
receive, at an aggregator, flow records from a plurality of flow collector devices that are disposed in a network to collect flow information;
prior to storing the flow records in the aggregator,
in response to determining that a first flow record and a second flow record, received at different flow collectors within a predefined time-period, have the same source and destination flow identifiers, and that the number of bytes, packets, and connections in the first flow record is greater than the number of bytes, packets, and connections, respectively, in the second flow record,
select the first flow record for storing in the aggregator, and
discard the second flow record;
store non-discarded flow records in the aggregator; and
create a connection table comprising the stored flow records indexed by source and destination flow identifiers.

13. The system of claim 12, wherein the connection table maps each node on the network to a record that stores information about traffic to or from the node.

14. The system of claim 12, wherein the connection table stores statistical information of packets on the network based on a time-slice basis.

15. The system of claim 12 wherein the time-period is a time slice.

16. The system of claim 12, wherein the instructions to determine that two flows have the same source and destination flow identifiers include instructions to determine that the two flows have the same source and destination addresses, source and destination ports, and protocol.

17. A non-transitory computer readable storage medium storing an executable that includes instructions to cause a computing device to:
receive, at an aggregator, flow records from a plurality of flow collector devices that are disposed in a network to collect flow information;
prior to storing the flow records in the aggregator,
in response to determining that a first flow record and a second flow record, received at different flow collectors within a predefined time-period, have the same source and destination flow identifiers, and that the number of bytes, packets, and connections in the first flow record is greater than the number of bytes, packets, and connections, respectively, in the second flow record,
select the first flow record for storing in the aggregator, and
discard the second flow record;
store non-discarded flow records in the aggregator; and
create a connection table comprising the stored flow records indexed by source and destination identifiers.

18. The non-transitory computer readable storage medium of claim 17, wherein the connection table maps each node on the network to a record that stores information about traffic to or from the node.

19. The non-transitory computer readable storage medium of claim 17, wherein the connection table stores statistical information of packets on the network based on a time-slice basis.

20. The non-transitory computer readable storage medium of claim 17, wherein the predefined time-period is a time slice.

21. The non-transitory computer readable storage medium of claim 17, wherein the instructions to determine that two flows have the same source and destination flow identifiers include instructions to determine whether the two flows have the same source and destination addresses, source and destination ports, and protocol.

22. A computer implemented method, comprising:
receiving, at an aggregator, flow records from a plurality of flow collector devices that are disposed in a network to collect flow information;
prior to storing the flow records in the aggregator,
in response to determining that two or more flow records, received at different flow collectors within a predefined time-period, have the same source and destination flow identifiers,
selecting a flow record from the two or more flow records that has the maximum number of bytes, packets, and connections among the two or more flow records, and
discarding flow records that were not selected;
storing non-discarded flow records in the aggregator; and
creating, at the aggregator, a connection table comprising the stored flow records indexed by source and destination flow identifiers, wherein the connection table maps each node on the network to a record that stores information about traffic to or from the node.

23. The method of claim 22, wherein the connection table stores statistical information of packets on the network based on a time-slice basis.

24. The method of claim 22, wherein the predefined time-period is a time slice.

25. The method of claim 22, wherein determining that two flows have the same source and destination flow identifiers includes determining that the two flows have the same source and destination addresses, the same source and destination ports, and the same protocol.

26. The method of claim 22, wherein the flow records in the connection table are indexed by time.

27. The method of claim 22, wherein the flow records in the connection table are indexed by source address, destination address and time.

28. A system comprising:
a computing device including a computer readable medium storing a computer program that includes instructions to cause the computing device to:
receive, at an aggregator, flow records from a plurality of flow collector devices that are disposed in a network to collect flow information;
prior to storing the flow records in the aggregator,
in response to determining that two or more flow records, received at different flow collectors within a predefined time-period, have the same source and destination flow identifiers, select a flow record from the two or more flow records that has the maximum number of bytes, packets, and connections among the two flow records, and
discard flow records from the two or more flow records that were not selected;
store non-discarded flow records in the aggregator; and
create a connection table comprising the stored flow records indexed by source and destination flow identifiers, wherein the connection table maps each node on the network to a record that stores information about traffic to or from the node.

29. The system of claim 28 wherein the connection table stores statistical information of packets on the network based on a time-slice basis.

30. The system of claim 28 wherein instructions to determine that two flows have the same source and destination flow identifiers include instructions to determine whether the two flows have the same source and destination hosts, source and destination ports and protocol.

31. A non-transitory computer readable storage device storing executable instructions to cause a computing device to:
receive, at an aggregator, flow records from a plurality of flow collector devices that are disposed in a network to collect flow information;
prior to storing the flow records in the aggregator,
in response to determining that two or more flow records, received at different flow collectors within a predefined time-period, have the same source and destination flow identifiers,
select a flow record from the two flow records that has the maximum number of bytes, packets, or connections among the two or more flow records, and
discard flow records from the two or more flow records that were not selected;
store non-discarded flow records in the aggregator; and
create a connection table comprising the stored flow records indexed by source and destination flow identifiers, wherein the connection table maps each node on the network to a record that stores information about traffic to or from the node.

32. The computer program product of claim 31, wherein the connection table stores statistical information of packets on the network based on a time-slice basis.

33. The computer program product of claim 31, wherein the instructions to determine that two flows have the same source and destination flow identifiers include instructions to determine that the two flows have the same source and destination addresses, source and destination ports and protocol.

* * * * *